United States Patent [19]

Ziegler

[11] Patent Number: 5,457,438

[45] Date of Patent: Oct. 10, 1995

[54] ANTITHEFT ALARM SYSTEM FOR MOTOR VEHICLES

[76] Inventor: Martin Ziegler, Brueckenstrasse 44b, 70376 Stuttgart, Germany

[21] Appl. No.: 268,190

[22] Filed: Jun. 29, 1994

[30] Foreign Application Priority Data

Jun. 29, 1993 [DE] Germany .............. 43 21 509.2

[51] Int. Cl.$^6$ ............................................... B60R 25/10
[52] U.S. Cl. ................. 340/426; 340/429; 307/10.2; 307/10.3; 33/366
[58] Field of Search ................. 340/426, 429; 307/10.2, 10.3; 33/366

[56] References Cited

U.S. PATENT DOCUMENTS

| | | | |
|---|---|---|---|
| 3,885,164 | 5/1975 | Vest | 307/10.3 |
| 4,493,155 | 1/1985 | Comeau et al. | 33/366 |
| 4,656,458 | 4/1987 | Iwata | 340/65 |
| 5,045,837 | 9/1991 | Gosker | 340/426 |

FOREIGN PATENT DOCUMENTS 2554400  5/1985  France .

*Primary Examiner*—Brent Swarthout
*Assistant Examiner*—Julie Lieu
*Attorney, Agent, or Firm*—Evenson, McKeown, Edwards & Lenahan

[57] ABSTRACT

An alarm system is disclosed which includes a triggering device which triggers a warning device in the case of an unauthorized change of the position of the motor vehicle. The device comprises a compass by means of which the actual position value is reported to a control apparatus. As soon as the compass reports a value to the control apparatus which deviates from the stored position value, the warning device is activated.

12 Claims, 2 Drawing Sheets

ANTITHEFT ALARM SYSTEM FOR MOTOR VEHICLES

BACKGROUND AND SUMMARY OF THE INVENTION

This invention relates to an antitheft alarm system for motor vehicles.

The number of vehicle thefts is increasing. In order to counteract these thefts, antitheft alarm systems are known which become operative when there is unauthorized access to the vehicle or violent acts are carried out against it. A number of useful device are available for this purpose.

It is an object of the invention to further develop these devices with the goal of improving the protection of motor vehicles against theft.

According to the invention, this object is achieved by providing a device for triggering an alarm system in the event of a change of the position of the vehicle.

The principal advantages achieved by means of the invention are that, in the event of a change of the position of the motor vehicle, for example, when it is attempted in an unauthorized manner to load the vehicle onto a truck by means of a fork lifter, the device will trigger the warning system. As a result, the attempted unauthorized act is interrupted or at least made difficult at an early stage. The device, which is equipped with a compass, is highly effective and can be implemented at reasonable expenditures, in that it may also be integrated into an existing alarm system which becomes operative, for example, in the case of an unauthorized access to the vehicle. Finally, the device, which consists of the compass and a control apparatus, may be installed as a constructional unit into an existing motor vehicle.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
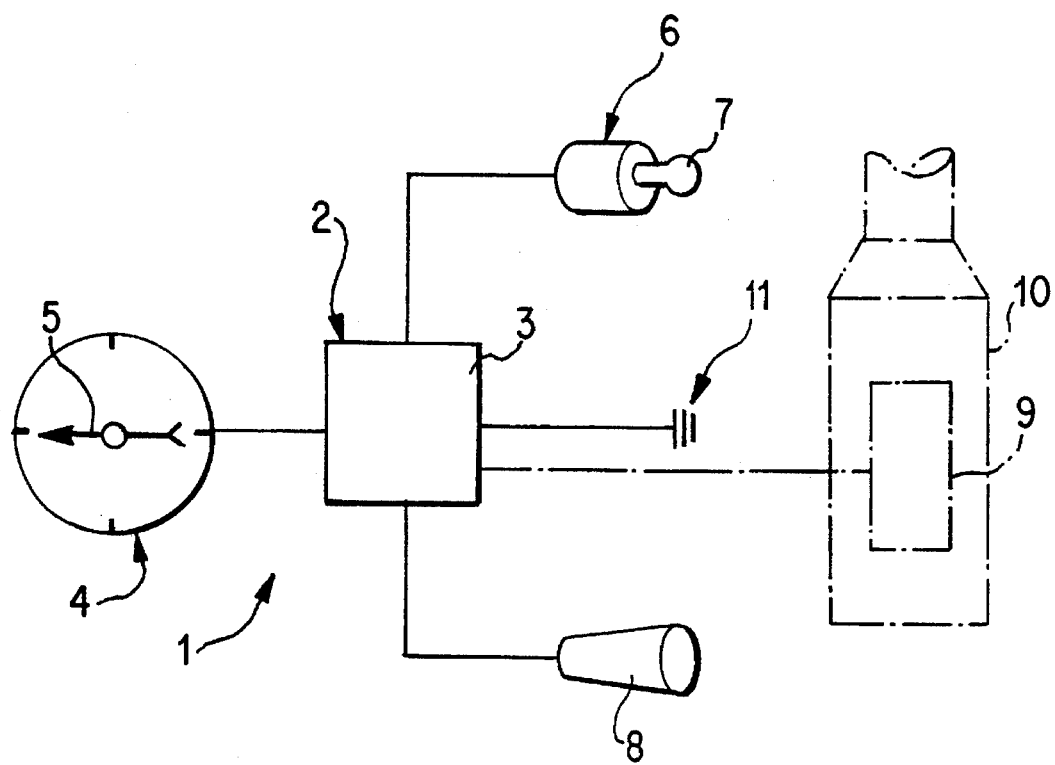
FIG. 1 schematically depicts the antitheft alarm system for motor vehicles according to preferred embodiments of the present invention.

A motor vehicle is equipped with an alarm system 1 which comprises an alarm control device 2 which is triggered in the case of an unauthorized change of the position of the motor vehicle in the horizontal directions. Embodiments are also contemplated where the alarm is triggered for vehicle movement in the vertical direction. Thus, any change in position of the vehicle triggers the alarm.

The device 2 comprises a control apparatus 3 and a compass 4 having a compass needle 5. Other devices than a compass which have the same effect of detecting vehicle movement are also contemplated for other non-illustrated embodiments. The control apparatus 3 has an ignition lock 6 with an ignition key 7 and a warning device 8 which emits acoustic signals. It may also be constructed such that visual signals are emitted. In addition, the control apparatus 3 is provided with an electrical/electronic device 9 for the management of an internal combustion engine 10. The device 2 is supplied with current at reference number 11.

Figure 2:
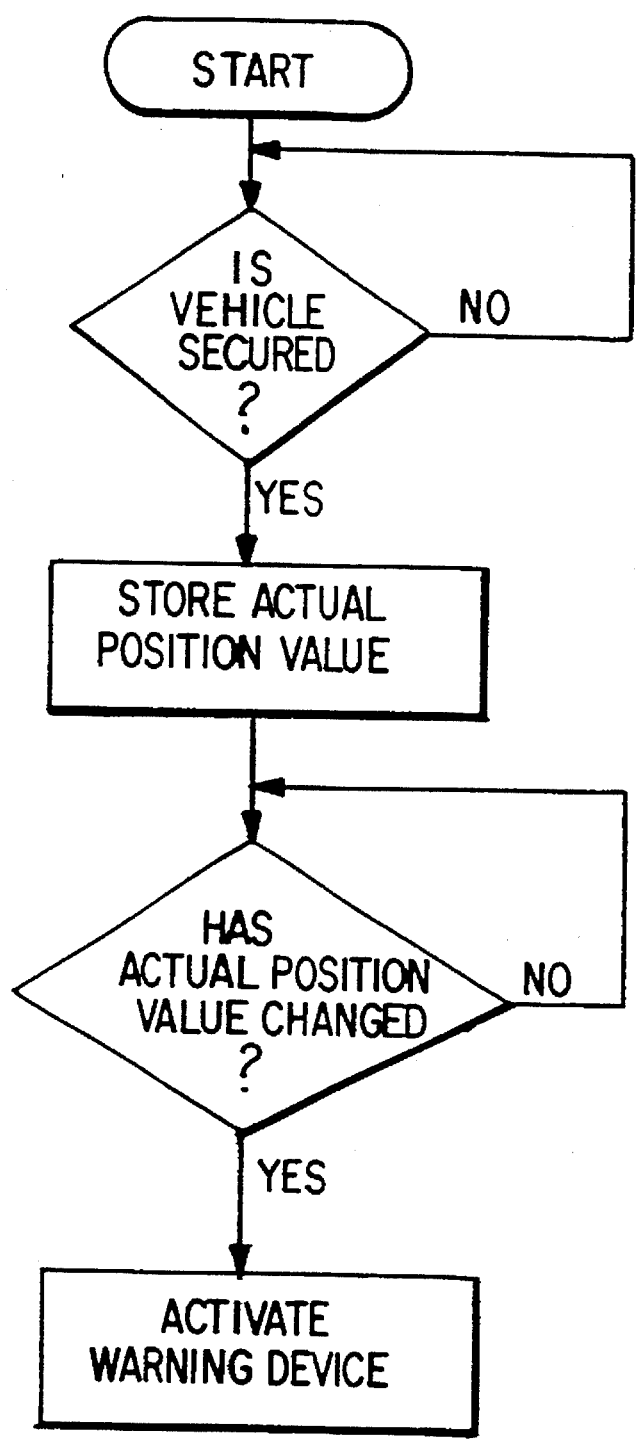
FIG. 2 is a flow chart according to the present invention.

For securing the motor vehicle, the ignition key 7 is withdrawn and the doors—not shown—are locked. As a result, an actual position value of the motor vehicle, which is defined by the compass needle 5, is stored in the control apparatus 3. If an attempt is made now to change the position of the motor vehicle in an unauthorized manner, for example, by means of a fork lifter, the compass needle 5 will deflect, whereby the control apparatus 3 determines a deviation from the stored position value and immediately activates the warning device 8. FIG. 2 is a flow chart illustrating this operation. At the same time, the device 9 for the engine management is influenced such that the start of the operation of the internal-combustion engine 10 will be prevented.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An antitheft alarm system for motor vehicles, comprising:

a warning device coupled to the alarm system;

a triggering device which triggers the alarm system in a case of an unauthorized act upon the motor vehicle;

wherein said triggering device comprises a compass and a control apparatus, said control apparatus including means for storing an actual position value of the motor vehicle received from the compass when the motor vehicle is secured; and means for determining a deviation from the stored actual position value and automatically activating the warning device when changes from said actual position value are determined.

2. An antitheft alarm system according to claim 1, wherein the control apparatus is activated as a function of an ignition lock of the motor vehicle.

3. An antitheft alarm system according to claim 2, wherein the control apparatus includes means for influencing the start of the operation of an internal-combustion engine of the motor vehicle.

4. An antitheft alarm system according to claim 3, wherein the triggering device, which comprises the compass and the control apparatus, is adapted to be integrated into an existing antitheft alarm system.

5. An antitheft device according to claim 3, wherein the triggering device, which comprises the compass and the control apparatus, is configured to be installed in a motor vehicle as a constructional unit.

6. An antitheft alarm system according to claim 2, wherein the triggering device, which comprises the compass and the control apparatus, is adapted to be integrated into an existing antitheft alarm system.

7. An antitheft device according to claim 2, wherein the triggering device, which comprises the compass and the control apparatus, is configured to be installed in a motor vehicle as a constructional unit.

8. An antitheft alarm system according to claim 1, wherein the control apparatus includes means for influencing the start of the operation of an internal-combustion engine of the motor vehicle.

9. An antitheft device according to claim 8, wherein the triggering device, which comprises the compass and the control apparatus, is configured to be installed in a motor vehicle as a constructional unit.

10. An antitheft alarm system according to claim 1, wherein the triggering device, which comprises the compass and the control apparatus, is adapted to be integrated into an existing antitheft alarm system.

11. An antitheft device according to claim 10, wherein the triggering device, which comprises the compass and the control apparatus, is configured to be installed in a motor vehicle as a constructional unit.

12. An antitheft alarm system according to claim 1, wherein the triggering device, which comprises the compass and the control apparatus, is configured to be installed in a motor vehicle as a constructional unit.

* * * * *